Dec. 23, 1941.   L. GOTTFRIED   2,266,752

BABY CARRIAGE

Filed May 7, 1940

INVENTOR.

Patented Dec. 23, 1941

2,266,752

UNITED STATES PATENT OFFICE 2,266,752

BABY CARRIAGE

Louis Gottfried, New York, N. Y.

Application May 7, 1940, Serial No. 333,704
In Luxemburg May 9, 1939

3 Claims. (Cl. 280—47)

This invention relates to baby carriages and the like vehicles as for instance an invalid carriage having a carriage body supported on a running gear.

One object of the present invention is to support the front and rear wheel axles in such a manner with elastic means that most of the jolting of the carriage is taken up by the movements of the axles without transmitting them to the carriage body. The said elastic means are urging the axles to return to their original position. So the axles are allowed to move in a vertical direction in respect to the carriage body staying in its place.

A further object of the present invention is the arrangement of means to avoid undesired lateral movements of the carriage body by arranging elastic means allowing to move the axles in the lateral directions in respect to the carriage body staying in its place.

Figure 1:
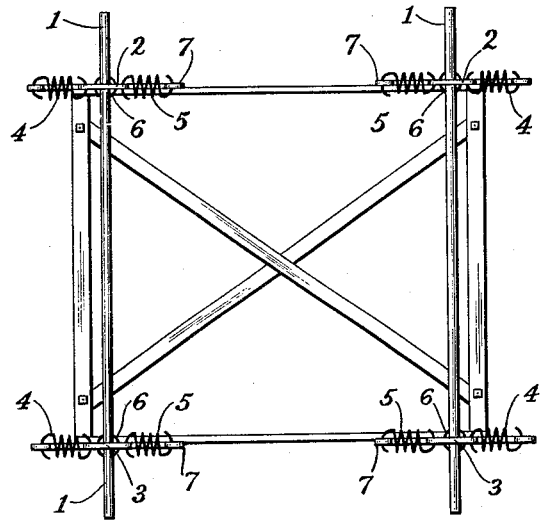
Figure 2:
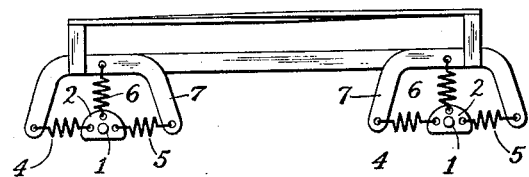
Figure 3:
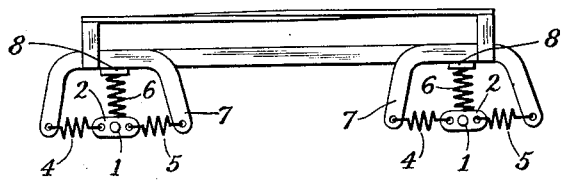
Figure 4:
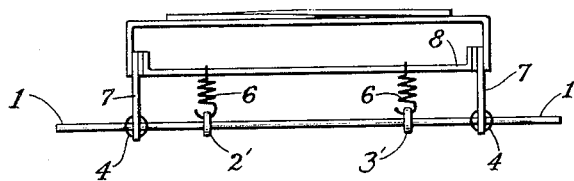

I attain these objects by mechanism illustrated in the accompanying drawing, in which Figure 1 is a plan view of the chassis seen from below; Figure 2 is a side elevation of the structure shown in Figure 1; Figures 3 and 4 are side elevation and front elevation of a modification.

Similar numerals refer to similar parts throughout the several views.

The chassis of the carriage is made in the usual manner of the conventional frame work consisting of two cross bars which are connected by diagonally arranged connecting rods.

The axles 1 of the carriage are connected with said cross bars by intermediate elastic means allowing vertical and lateral movements to said axles in respect to said cross bars. On the axles are arranged assistance parts 2 and 3 for fixing one end of springs 4 and 5 or some other equivalent elastic means, to balance the lateral movements of the axles 1.

The end of at least another spring 6 or some other equivalent elastic means is fixed on said assistance parts 2 and 3, the said spring 6 extending in vertical direction, to balance the vertical movement of the axles 1. But this spring 6 does not only stop the vertical movements of the axles 1 but also opposes to the lateral movements of the axles 1. Besides that the said spring 6 also hinders the axle 1 to stay in an oblique position.

The springs 4, 5 and 6 according to the realisation of the invention shown in Fig. 2 are fixed as mentioned before on one end with the said assistance parts 2 and 3 and on the other end with a member in the shape of horseshoe 7 which is fixed with the crossbars of the framework.

In a different realisation of the invention shown in Figs. 3 and 4 just the lateral extending springs 4 and 5 are fixed on one end with said assistance parts 2 and 3 and on the other end with the horseshoe shaped member 7, the vertical springs 6 being arranged on different points of the axles 1 than that of the lateral springs 4 and 5 by providing different assistance parts 2' and 3' on each of the axles 1 for fixing one end of these springs 6 the other end being fixed with special arranged cross bars 8. It is possible to make some changes in the position of the different parts without abandoning this invention. For instance it may adapt just one group of the springs 4, 5 and 6 in the middle of the axles 1 by arranging just one horseshoe member 7 for each axle which is connected by an angle bar with a metal plate fixed on the chassis above of and parallel to the axles.

Furthermore the fixing together of the different parts may be arranged by rivets, screws or some other connecting means.

The lateral movement of the assistance parts 2 and 3 may be limited by bolts (not shown in the drawing).

The said assistance parts 2 and 3 may consist of bearings permitting the axles a turning movement.

I claim:

1. In a baby-carriage the combination of a frame work constituting the chassis of said carriage with the axles of the carriage wheels, said axles being suspended near each end by at least two lateral draw springs and at least one vertical tension spring so arranged as to limit the movement of the axle transversely to said chassis, one end of each of said springs being connected with parts arranged on said axles and the other end of said springs being connected with said chassis.

2. In a baby-carriage the combination of a frame work constituting the chassis of said carriage with the axles for the carriage wheels, said axles being suspended near each end by at least two lateral draw springs and at least one vertical tension spring so arranged as to limit the movement of the axle transversely to said chassis, all the springs at each end of the axle being connected with the same part arranged on said axle, the other end of said springs being connected with said chassis.

3. In a baby-carriage the combination of a frame work constituting the chassis of said carriage with the axles for the carriage wheels, said axles being suspended near each end by at least two lateral draw springs and at least one vertical tension spring so arranged as to limit the movement of the axle transversely to said chassis, the lateral springs and the vertical spring respectively being connected on one end with different parts arranged on the axles and on the other end with different parts of said chassis.

LOUIS GOTTFRIED.